United States Patent
Sunagawa et al.

(10) Patent No.: US 6,813,232 B1
(45) Date of Patent: Nov. 2, 2004

(54) OPTICAL INFORMATION RECORDING/REPRODUCING METHOD AND DEVICE THEREFOR

(75) Inventors: Ryuichi Sunagawa, Takasaki (JP);
Hironobu Shimizu, Takasaki (JP);
Atsuo Shimizu, Saitama (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/719,057

(22) PCT Filed: Apr. 12, 2000

(86) PCT No.: PCT/JP00/02362

§ 371 (c)(1),
(2), (4) Date: Dec. 8, 2000

(87) PCT Pub. No.: WO00/62284

PCT Pub. Date: Oct. 19, 2000

(30) Foreign Application Priority Data

Apr. 12, 1999 (JP) .......................................... 11/103548

(51) Int. Cl.⁷ ................................................ G11B 5/58
(52) U.S. Cl. ...................................................... 369/53.2
(58) Field of Search ............................ 369/53.2, 275.4, 369/112.28, 275.3, 112.18, 112.06, 59.11, 47.51, 47.53

(56) References Cited

U.S. PATENT DOCUMENTS 4,558,441 A * 12/1985 Yokota et al. ........... 369/59.11
5,699,342 A * 12/1997 Yagi et al. .................. 369/47.5
5,898,654 A * 4/1999 Shimada et al. ......... 369/44.32
6,414,913 B1 * 7/2002 Kobayashi et al. ........... 369/14

FOREIGN PATENT DOCUMENTS

| JP | 8-124167 | 5/1996 |
|---|---|---|
| JP | 9-282659 | 10/1997 |

* cited by examiner

Primary Examiner—A. J. Heinz
Assistant Examiner—Kimlieu Le
(74) Attorney, Agent, or Firm—Finnegan, Henderson, Farabow, Garrett & Dunner, L.L.P.

(57) ABSTRACT

An optical information recording/reproducing method and a device are provided, which can optimally record and reproduce information onto and from an optical information recording medium such as CD-R or DVD-R for high-density recording. A reproducing signal corresponding to a pit-land pattern recorded on the optical information recording medium is obtained by irradiating laser light to the optical information recording medium to judge a relative effective spot diameter of the laser light corresponding to a standard length T according to the reproducing signal, a correction range at recording of information is specified according to the judged effective spot diameter, a recording pulse is corrected according to the specified correction range, and a correction range of the reproducing signal at reproduction of information is specified to correct the reproducing signal according to the specified correction range.

28 Claims, 15 Drawing Sheets

| RECORDING PIT | FRONT SIDE | CORRECTION AMOUNT | REAR SIDE | CORRECTION AMOUNT |
|---|---|---|---|---|
| 3T | P3-L3 | +5ns | L3-P3 | +3ns |
| 3T | P*-L3 | +3ns | L3-P* | +2ns |
| 3T | L4 | +2ns | L4 | +1ns |
| 3T | L5 | +1ns | L5 | +0.5ns |
| 3T | L6 | +1ns | L6 | +0.5ns |
| 4T | P3-L3 | +3ns | L3-P3 | +1ns |
| 4T | P*-L3 | +2ns | L3-P* | +0.5ns |
| 4T | L4 | +1ns | L4 | +0.5ns |
| ⋮ | ⋮ | ⋮ | ⋮ | ⋮ |

FIG. 12

OPTICAL INFORMATION RECORDING/REPRODUCING METHOD AND DEVICE THEREFOR

TECHNICAL FIELD

The present invention relates to an optical information recording/reproducing method and a device, and particularly to an optical information recording/reproducing method and a device capable of high-speed, high-density recording of information.

BACKGROUND ART

Conventionally known optical information recording mediums include CDs (Compact Discs), DVDs (Digital Versatile Discs), and the like. Among them, CD-R (Compact Disc-Recordable), DVD-R (Digital Versatile Disc-Recordable) and the like are known as a write once type (a postscript type).

CD-R and DVD-R have a basic structure comprising a transparent substrate on which spiral pregroups are formed, a recording layer made of an organic pigment film formed on the substrate, a reflection layer made of a metallic film formed on the recording layer and a protection layer nade of ultraviolet setting resin formed on the reflection layer. And, a laser beam is irradiated from the transparent substrate side to the recording layer to partially decompose the pigment on the recording layer so to record on the disc.

Specifically, when information is to be recorded on the optical recording medium such as CD-R or DVD-R, information to be recorded is recorded by irradiating laser light in a pulse form to the spinning recording medium to partially decompose the pigment of the recording layer so to change optical characteristics to form pits according to a digitized digital signal (recording pulse).

When the aforesaid pits are formed on the optical information recording medium, the intensity of the laser light irradiated while a recording pulse is at a high level is enhanced high, and a state of the recording layer is changed by the laser beam energy to form the pits. For example, in a period when the recording pulse is at a low level, laser light having a low optical intensity required for tracking is irradiated.

Meanwhile, there is also proposed a technology to enable high-speed recording by increasing a rotation speed of the optical information recording medium and quickening the cycle of a digital signal according to the increased rotation speed. And, there is also proposed a technology to record information at a speed faster by 8 to 12 times or at a faster recording speed.

In view of advantages of compatibility with CD and a less unit price per pit than paper, CD-R among the optical information recording mediums is rapidly expanding its market. And, recording devices capable of writing at a recording speed 10 times or more faster than an ordinary speed and corresponding media are also being put on the market in response to demands for high-speed processing.

Besides, it is desired on the market that a larger capacity is provided to correspond with the amount of data processing which is increasing every year, and a capacity of 1.3 GB (Gigabytes) or more with respect to the amount of data for image processing or the like.

CD-R reproducible by the general CD or CD-ROM drive has a maximum recording capacity of 700 MB, and there is no CD-R having a higher capacity available on the market.

DVD-R has substantially the same disc shape as CD and its recordable amount of information is 4.7 GB about 7 times larger than the amount of information recordable on the present CD. Such a medium having a large information recording capacity is expected to contribute to the multimedia information society.

A conventional CD-R previously determines a correction range of heat interference from a pickup having a standard sport diameter and a value experimentally obtained from the standard pickup. When the recording pulse is corrected only in the previously determined range, the heat interference can be almost canceled without considering variations of the pickups and media.

CD-R and DVD-R for high-density recording, however, record information at a higher density than the conventional CD-R, so that the information recording method and information recording device used for CD-R often had problems that an error occurs often in information, or information cannot be recorded properly.

For example, CD-R and DVD-R for high-density recording have a smaller track pitch and a smaller minimum pit length than the conventional CD-R and, therefore, are susceptible to a heat influence when prior and subsequent pits are formed to record information. Therefore, pits may not be formed at desired positions, and jitter is deteriorated when information is reproduced. The same is also applied when recording is performed at a high speed.

Especially, DVD-R has a smaller ratio between the spot diameter and the minimum pit length than the conventional CD-R (about ½ in comparison with CD), and variations in the production of pickups and media influence largely upon the characteristics. Therefore, it is necessary to separately determine a correction range for canceling the heat interference with the variations of the production taken into consideration.

The correction range and an amount of correction have a relation of 1 to 1 between the drive device and the medium. And, a sufficient recording/reproducing property was sometimes not attainable if they are not adjusted optimally.

DISCLOSURE OF THE INVENTION

It is an object of the present invention to provide an optical information recording/reproducing method and a device therefor which can optimally record and reproduce information on and from an optical information recording medium such as CD-R or DVD-R for high-density recording.

It is also an object of the present invention to provide an optical information recording/reproducing method which can optimally record information by determining a correction range of heat interference by judging an effective spot diameter so to correct a recording pulse.

It is another object of the present invention to provide an optical information recording/reproducing method which can reproduce information by optimally correcting a reproducing signal by judging an effective spot diameter.

The optical information recording method according to the present invention is an optical information recording/reproducing method which irradiates laser light corresponding to a recording pulse to an optical information recording medium to form a pit-land pattern consisting of pits and lands having a plurality of lengths in integral multiple nT (n is an integer) of a predetermined standard length T so to record information, the method comprising: a first step of irradiating the laser light to the optical information recording medium to obtain a reproducing signal corresponding to the pit-land pattern recorded on the optical information recording medium and judging a relative effective spot diameter of the laser light corresponding to the standard length T according to the reproducing signal, and a second step of specifying a correction range at recording the information according to the effective spot diameter judged in the first step and correcting the recording pulse according to the specified correction range.

The effective spot diameter is a relative value to the standard length T, namely a value determined as an integral multiple of the standard length T and indicates a correction range of heat interference at information recording.

According to the present invention, the recording pulse is corrected by judging the correction range of the heat interference according to the effective spot diameter.

The recording pulse according to the invention controls the energy of the laser light output from, for example, an optical pickup in order to record information by forming the pits and lands having the plurality of lengths in integral multiple nT (n is an integer) of the predetermined standard length T. For example, an EFM (Eight Fourteen Modulation) signal can be used.

The first step separately reads the plurality of pits or lands having the different lengths previously recorded on the optical information recording medium to obtain a plurality of reproducing signals corresponding to the pits or lands having the different lengths, and judges the effective spot diameter according to the length of the pit or land with which amplitudes of the reproducing signals become saturated and constant.

Specifically, the amplitudes of the reproducing signals of the pit or land, namely modulation degrees, are changed depending on the pit or land and the spot diameter of the laser light irradiated onto the optical information recording medium to reproduce.

When the pit or land has a small length to the spot diameter, the modulation degree becomes large and the amplitude of the reproducing signal becomes small. Conversely, when the pit or land has a large length to the spot diameter, the modulation degree becomes large and the amplitude of the reproducing signal becomes large.

The amplitude of the reproducing signal becomes constant and saturated when the length of the pit or land to the spot diameter exceeds a predetermined level.

The present invention judges the effective spot diameter according to the length of the pit or land where the amplitude of the reproducing signal becomes saturated and constant.

The first step obtains an eye pattern of the reproducing signal by reading the plurality of pits or lands having the different lengths previously recorded on the optical information recording medium and determines the effective spot diameter according to the length of the pit or land with which an amplitude of the eye pattern becomes saturated and constant.

Generally, the eye pattern of the reproducing signal is influenced by distortion, noise, intersymbol interference, rotation jitter or the like of the recording pit. But, the length of the pit or land with which the amplitude of the eye pattern becomes saturated and constant can be judged as the effective spot diameter.

The first step reads the predetermined pit-land pattern in which the length of the pit or land previously recorded on the optical information recording medium changes sequentially and judges the effective spot diameter according to the length of the pit or land with which an amplitude of the reproducing signal obtained by the above reading becomes saturated and constant.

Thus, when the effective spot diameter can be judged, the correction range of the recording pulse at recording can be specified according to the effective spot diameter, and the recording pulse can be corrected optimally to record optimally.

And, when the effective spot diameter can be judged, the correction range of the reproducing signal at reproducing can be specified according to the effective spot diameter, and the reproducing signal can be corrected optimally.

In other words, the second step at recording presumes a level of heat interference at recording of the pit or land to be recorded according to the pit-land pattern to be recorded at the front and rear of the pit or land to be recorded and the effective spot diameter judged in the first step, and corrects the recording pulse corresponding to the pit or land to be recorded according to the presumed level of the heat interference.

At this time, the second step can be configured to correct a rising timing or a falling timing of the recording pulse corresponding to the pit to be recorded according to a length of a reference land immediately in front of or behind the pit to be recorded.

The second step can also be configured to correct a rising timing or a falling timing of the recording pulse corresponding to the pit to be recorded according to a length of a reference land immediately in front of the pit to be recorded and a length of a reference pit immediately in front of or behind the reference land. The second step can also be configured to correct a rising timing or a falling timing of the recording pulse corresponding to the pit to be recorded according to the length of the pit to be recorded.

The second step can also be configured to correct a rising timing or a falling timing of the recording pulse corresponding to the pit to be recorded according to a recording speed.

The optical information recording/reproducing method of the present invention is an optical information recording/reproducing method which irradiates laser light corresponding to a recording pulse to an optical information recording medium to form a pit-land pattern consisting of pits and lands having a plurality of lengths in integral multiple nT (n is an integer) of a predetermined standard length T so to record information, the method comprising: a first step of irradiating the laser light to the optical information recording medium to obtain a reproducing signal corresponding to the pit-land pattern recorded on the optical information recording medium and judging a relative effective spot diameter of the laser light corresponding to the standard length T according to the reproducing signal, and a second step of specifying a correction range at reproduction of the information according to the effective spot diameter judged in the first step and correcting the reproducing signal according to the specified correction range.

The effective spot diameter indicates a range to change the amplitude and frequency component of the reproducing signal at reproduction of the information.

Then, the present invention specifies a range giving changes in the amplitude and frequency component of the reproducing signal according to the effective spot diameter so to correct the reproducing signal.

In other words, the second step in reproduction of the information presumes a level of changes in amplitude and frequency component of the reproducing signal at reproduction of the pit or land to be reproduced according to an effective spot diameter judged in the first step and the pit-land pattern recorded at the front and rear of the pit or land to be reproduced and corrects the reproducing signal corresponding to the pit or land to be reproduced according to a presumed level of the changes in the amplitude and frequency component.

The second step can correct the changes in amplitude and frequency component of the reproducing signal by adjusting a gain and a delay amount of the reproducing signal.

A gain of the reproducing signal and a delay amount can be adjusted by a combination of an equalizer and a low-pass filter.

The optical information recording/reproducing device according to the present invention is an optical information recording/reproducing device which irradiates laser light corresponding to a recording pulse to an optical information recording medium to form a pit-land pattern consisting of pits and lands having a plurality of lengths in integral multiple nT (n is an integer) of a predetermined standard length T so to record information, the device comprising: effective spot diameter judging means which irradiates the laser light to the optical information recording medium to obtain a reproducing signal corresponding to the pit-land pattern recorded on the optical information recording medium and judges a relative effective spot diameter of the laser light corresponding to the standard length T according to the reproducing signal, and recording pulse correcting means which specifies a correction range at recording of the information according to the effective spot diameter judged by the effective spot diameter judging means and corrects the recording pulse according to the specified correction range.

The effective spot diameter judging means separately reads the plurality of pits or lands having the different lengths previously recorded on the optical information recording medium and judges the effective spot diameter according to the length of the pit or land with which amplitudes of a plurality of reproducing signals corresponding to the pits or lands having the different lengths obtained by reading become saturated and constant.

The effective spot diameter judging means reads the predetermined pit-land pattern in which the lengths of the pits or lands previously recorded on the optical information recording medium change sequentially and judges the effective spot diameter according to the length of the bit or land with which an amplitude of the reproducing signal obtained by the above reading becomes saturated and constant.

The recording pulse correcting means presumes a level of heat interference at recording of the pit or land to be recorded according to the effective spot diameter judged by the effective spot diameter judging means and the pit-land pattern to be recorded at the front and rear of the pit or land to be recorded and corrects a storage pulse corresponding to the pit or land to be recorded according to the presumed level of heat interference.

The optical information recording/reproducing device according to the present invention is an optical information recording/reproducing device which irradiates laser light corresponding to a recording pulse to an optical information recording medium to form a pit-land pattern consisting of pits and lands having a plurality of lengths in integral multiple nT (n is an integer) of a predetermined standard length T so to record information, the device comprising: effective spot diameter judging means which irradiates the laser light to the optical information recording medium to obtain a reproducing signal corresponding to the pit-land pattern recorded on the optical information recording medium and judges a relative effective spot diameter of the laser light corresponding to the standard length T according to the reproducing signal, and reproducing signal correcting means which specifies a correction range at reproduction of the information according to the effective spot diameter judged by the effective spot diameter detecting means and corrects the reproducing signal according to the specified correction range.

The effective spot diameter judging means separately reads the plurality of pits or lands having the different lengths previously recorded on the optical information recording medium and judges the effective spot diameter according to the length of the pit or land with which amplitudes of the plurality of reproducing signals corresponding to the pits or lands having the different lengths obtained by the above reading becomes saturated and constant.

The effective spot diameter judging means reads the predetermined pit-land pattern in which the lengths of the pits or lands previously recorded on the optical information recording medium change sequentially and judges the effective spot diameter according to the length of the bit or land with which an amplitude of the reproducing signal obtained by the above reading becomes saturated and constant.

The reproducing signal correcting means presumes a level of changes in amplitude and frequency component of the reproduction signal at reproduction of the pit or land to be reproduced according to the effective spot diameter judged by the effective spot diameter judging means and the pit-land pattern to be recorded at the front and rear of the pit or land to be reproduced, and corrects the reproducing signal corresponding to the pit or land to be reproduced according to a presumed level of the changes in the presumed amplitude and frequency component.

The reproducing signal correcting means adjusts a gain of the reproducing signal and a delay mount to correct the changes in the amplitude and the frequency component of the reproducing signal.

The gain and the delay amount of the reproducing signal can be adjusted by a combination of an equalizer and a low-pass filter.

BRIEF DESCRIPTION OF THE DRAWINGS

FIG. 12 is a diagram showing an embodiment of correction of a light pulse;

BEST MODES FOR CARRYING OUT THE INVENTION

An embodiment of an optical information recording/reproducing method and device therefor according to the present invention will be described with reference to the accompanying drawings.

In this embodiment, known DVD-R which is a write once type optical information recording medium for forming pits on recording tracks by changing a recording layer by heat energy of laser light will be described. The present invention can also be applied in substantially the same way when the known CD-R is used as the write once type optical information recording medium.

Generally, heat interference involved when information is recorded on the write once type optical information recording medium (hereinafter simply called the optical disc) includes one caused due to overlapping of laser light spot diameters (hereinafter simply called the spot diameters) and another caused due to heat conduction on the medium when pits are formed. The heat interference means a change in a pit form caused in a pit pattern (intersymbol) when heat recording is conducted on CD-R or DVD-R.

The present invention is mainly described about a method to deal with an influence of heat interference due to the aforesaid spot diameters. The heat interference means a change in pit form caused in a pit pattern (intersymbol) when heat recording is effected on CD-R, DVD-R or the like.

Specifically, it is known that the heat interference due to the aforesaid heat conduction is mostly remedied fundamentally by recording information according to, for example, a pulse train method (comb pulse) or the like.

But, the spot diameter becomes larger than the size of the pit when information is recorded on a high-density recording medium such as DVD-R, and excess heat energy which is irrelevant to the pit formation is applied into the spot diameter. Interference by this heat energy becomes a main component to cause the heat interference due to the spot diameter that the pit form at information recording is disturbed.

Therefore, in order to form pits having an optimum form, it is necessary to correct a recording pulse (write pulse) considering excess heat energy to be applied into the spot diameter at pit forming.

FIG. 1 shows a relation between pit 20-1 formed on an optical information recording medium by laser light irradiated according to a light pulse and a spot diameter of the laser light irradiated onto the optical information recording medium.

Figure 1A:
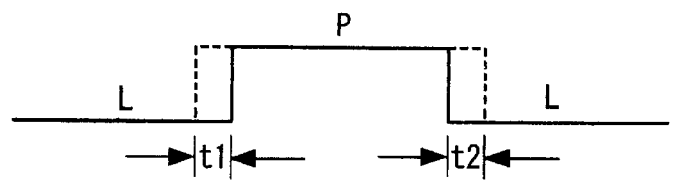
FIGS. 1(a) to 1(c) are diagrams showing a relation between a pit formed on an optical information recording medium by laser light irradiated according to a light pulse and a spot diameter of the laser light irradiated onto the optical information recording medium.

In FIG. 1, FIG. 1(a) shows an example of a light pulse. When this light pulse has a low level, the laser light irradiated onto the optical information recording medium is controlled to a low light intensity needed for tracking, and when the light pulse has a high level, the laser light is controlled to a high intensity sufficient for changing a state of the recording layer of the optical information recording medium.

The laser light irradiated onto the optical information recording medium is emitted from a semiconductor laser disposed within a so-called optical pickup. The light beam emitted from the semiconductor laser comprises a Gaussian beam whose intensity distribution in a sectional (lateral) direction is substantially a Gaussian distribution. And, when this light beam is concentrated by an objective lens of the optical pickup, a spot having side lobes called an airy pattern is formed.

Figure 1B:
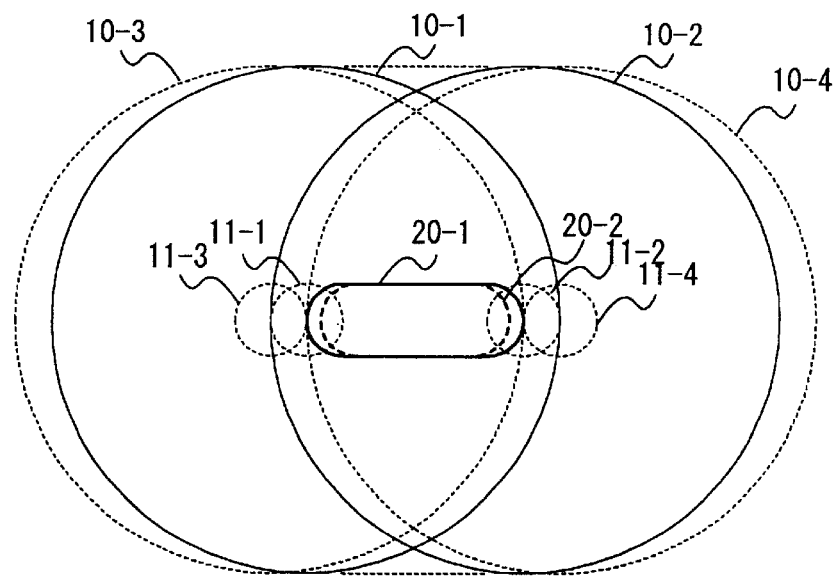
Figure 1C:
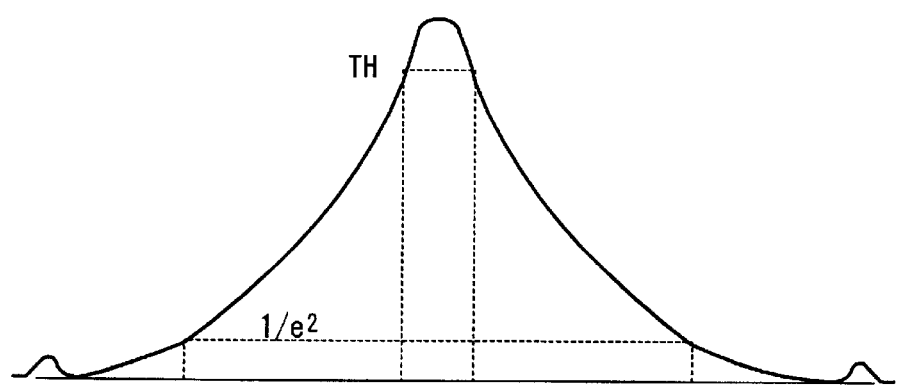

FIG. 1(c) schematically shows an intensity distribution of the light beam output from the optical pickup. The present invention determines a diameter, which is $1e^2$ of a center intensity of the light beam, as a spot diameter of the laser light for recording/reproducing. The laser light output from the semiconductor laser of the optical pickup is mostly included in the spot diameter.

A portion exceeding predetermined threshold level TH of the laser light shown in FIG. 1(c) has an intensity sufficient to change a state of the recording layer of the optical information recording medium. The state of the recording layer of the optical information recording medium is changed by the laser light energy at the aforesaid portion exceeding the threshold level TH. Accordingly, pit 20-1 shown in FIG. 1(b) is formed.

In FIG. 1(b), when the light pulse for forming the pit 20-1 changes as indicated by the solid line of FIG. 1(a), the light pulse rises, the intensity of the laser light irradiated onto the optical information recording medium is controlled from a low light intensity needed for tracking to a high intensity for forming the pit, and when the light pulse falls, it is controlled to change from the high intensity to the low light intensity.

A spot of the laser light formed on the optical information recording medium by the rising of the light pulse is indicated by 10-1. This spot 10-1 moves to spot 10-2 to form the pit 20-1.

But, a start-up of the laser light takes a predetermined time constant. When the intensity of the laser light is switched in simple time synchronization with the light pulse, a length of the pit actually formed on the recording layer becomes shorter than a desired pit length, namely a pit length indicated by the pit 20-1. Thus, the formed pit is pit 20-2 as indicated by the dotted line of Fig. 1(b).

Therefore, rising and falling of the light pulse are corrected by time t1 and t2 as indicated by the dotted lines in FIG. 1(a) to control to form a pit having a desired pit length, namely a pit length indicated by the pit 20-1.

In this case, the spot of the laser light formed on the optical information recording medium owing to the rising of the light pulse is as indicated by spot 10-3. This spot 10-3 moves to the position of spot 10-4.

As it is known, when a standard length is T, DVD-R records information by forming pits and lands having ten types of lengths 3T to 11T and 14T on the recording layer.

When the pit formed on the recording layer has a short length as indicated by 3T, the laser light energy applied to the recording layer is small. And, it is necessary to enlarge correction amounts t1 and t2 of the light pulse. On the other hand, when the pit has a large length, the laser light energy applied to the recording layer becomes large. Therefore, the correction amounts t1 and t2 of the light pulse are allowed to be small.

The correction amount is related to a relative pit length with respect to the spot diameter and may be small when the spot diameter is small as compared with the pit length. But, when the spot diameter is large as compared with the pit length as in the case of the present invention that high-density recording is performed, its correction becomes significant.

In the aforesaid description, an influence of the heat interference owing to the formation of the neighboring pits is not taken into consideration. When the influence of the heat interference owing to the formation of the neighboring pits is taken into consideration, the description becomes more complex.

Figure 2A:
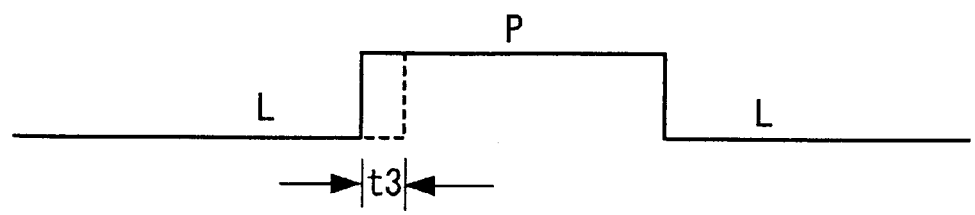
FIGS. 2(a) and 2(b) are diagrams illustrating an influence of heat interference due to formation of neighboring pits.
Figure 2B:
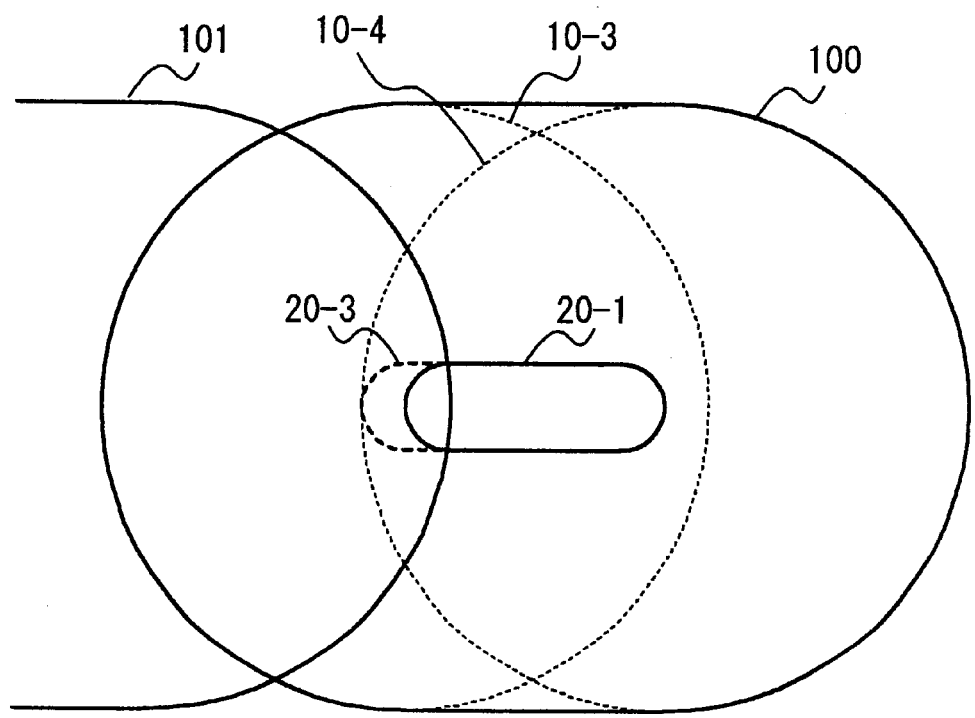

FIGS. 2(a) and 2(b) are diagrams illustrating an influence of heat interference due to the formation of a neighboring pit.

It is assumed that the pit 20-1 is formed as shown in FIGS. 2(a) and 2(b). In this case, the laser light is irradiated to area 100 shown in FIG. 2(b).

Another pit (not shown) is formed before the pit 20-1 is formed. And, it is assumed that the laser light was previously irradiated to area 101 shown in FIG. 2(b).

The areas 100 and 101 shown in FIG. 2(b) do not have an intensity enough to change a state of the recording layer at all portions, but the laser light energy is accumulated in these areas 100 and 101.

Therefore, when the area 101 of the laser light irradiated to form the former pit comes to overlap with the end of the pit 20-1 as shown in FIG. 2(b), the end of the pit 20-1 is displaced from a desired position as indicated by the dotted line as pit 20-3 owing to the accumulation of the laser light energy.

Therefore, it is necessary to correct the rising of the light pulse by time t3 as indicated by the dotted line of FIG. 2(a).

Figure 3A:
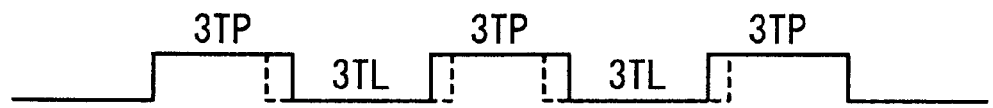
FIGS. 3(a) and 3(b) are diagrams illustrating an influence of heat interference when pits and lands each having length 3T are continuously recorded.
Figure 3B:
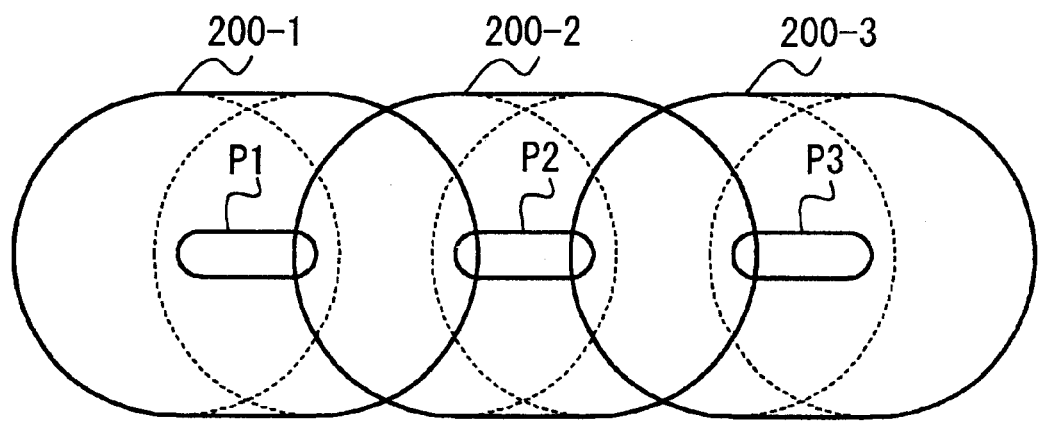

FIGS. 3(a) and 3(b) show that pits P1, P2, P3 having length 3T are continuously recorded with a land having length 3T intervened among them.

In such a case, the laser light is irradiated to area 200-1 to form the pit P1, to area 200-2 to form the pit P2 and to area 200-3 to form the pit P3. The laser light irradiated to the area 200-2 to form the pit P2 influences on the rear end of the pit P1, the laser light irradiated to the area. 200-1 to form the pit P1 influences on the front end of the pit 2, the laser light irradiated to the area 200-3 to form the pit P3 influences on the rear end of the pit 2, and the laser light irradiated to the area 200-2 to form the pit P2 influences on the front end of the pit P3.

Therefore, it is necessary to correct a falling part of pulse 3TP corresponding to the pit P1, a rising part and a falling part of pulse 3TP corresponding to the pit P2 and a rising part of pulse 3TP corresponding to the Pit P3 by the light pulse as indicated by dotted lines in FIG. 3(a).

It is found that the above correction of the light pulse is influenced by the spot diameter of the relative laser light to the recorded pit patterns and pits as apparent from the above description. The spot diameter is not uniform among the individual optical information recording/reproducing devices. Especially, the spot diameter to the pit becomes large in the high-density recording, so that it is important to correct the light pulse corresponding to the spot diameter.

Specifically, DVD-R records information by forming on the recording layer the pits and lands having ten types of lengths 3T to 11T and 14T when the standard length is T as described above. When the effective spot diameter to the standard length T can be determined accurately, the light pulse can be corrected optimally with the influence of the heat interference due to the spot diameter taken into consideration. And, when the effective spot diameter to the standard length T can also be determined accurately at reproducing, the optimum correction of the reproducing signal can be made.

According to the present invention, the effective spot diameter is judged by the following method.
(First method)

DVD-R records information by forming pits and lands having ten types of lengths 3T to 11T and 14T on the recording layer when the standard length is assumed to be T.

When the pit has a short length with respect to the spot diameter, the pit covered by the spot diameter is small. And, when this pit is reproduced, a modulation degree, namely the amplitude of the reproducing signal, is small.

But, when the pit has a long length with respect to the spot diameter and it is reproduced, the modulation degree becomes high, and the amplitude of the reproducing signal becomes large. And, when the pit length to the spot diameter becomes a predetermined level or more, the modulation degree becomes saturated and the amplitude of its reproducing signal becomes constant.

In view of the above phenomenon, the first method judges, as an effective spot diameter, a pit length on the boundary, where the modulation degree becomes saturated and the amplitude of its reproducing signal becomes constant.

Figure 4:
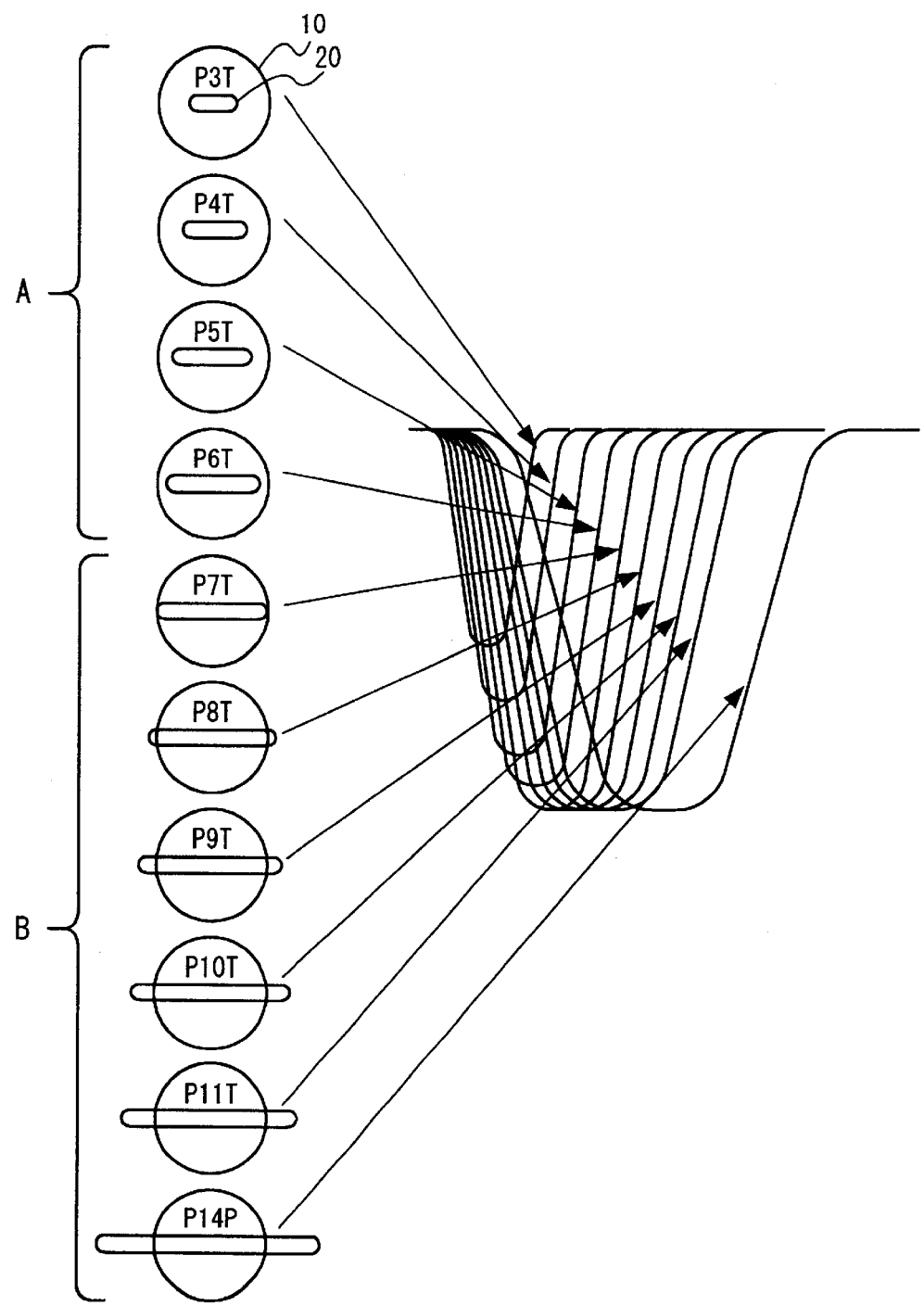
FIG. 4 is a diagram illustrating the judgement of effective spot diameters according to a reproduction signal when pits having a different length of DVD-R are read.

FIG. 4 shows reproducing signals (RF signals) when the pits having ten types of lengths 3T to 11T and 14T of DVD-R are read.

It is apparent from FIG. 4 that when pit 20 has lengths 3T to 6T (range A) which are smaller than spot diameter 10, the amplitudes of the RF signals increase sequentially when pits P3T to P6 are read.

But, when the pit 20 has length 7T larger than the spot diameter 10, the amplitude of the RF signal becomes saturated. Then, when the pits P7T to P14T having lengths 7T to 14T (range B) are read, the amplitudes of the RF signals do not change but remain constant.

Accordingly, a pit length on the boundary where the RF signal has a constant amplitude, namely 7T, is judged as an effective spot diameter.

The aforesaid method can also determine from an eye pattern of the RF signal.

Figure 5:
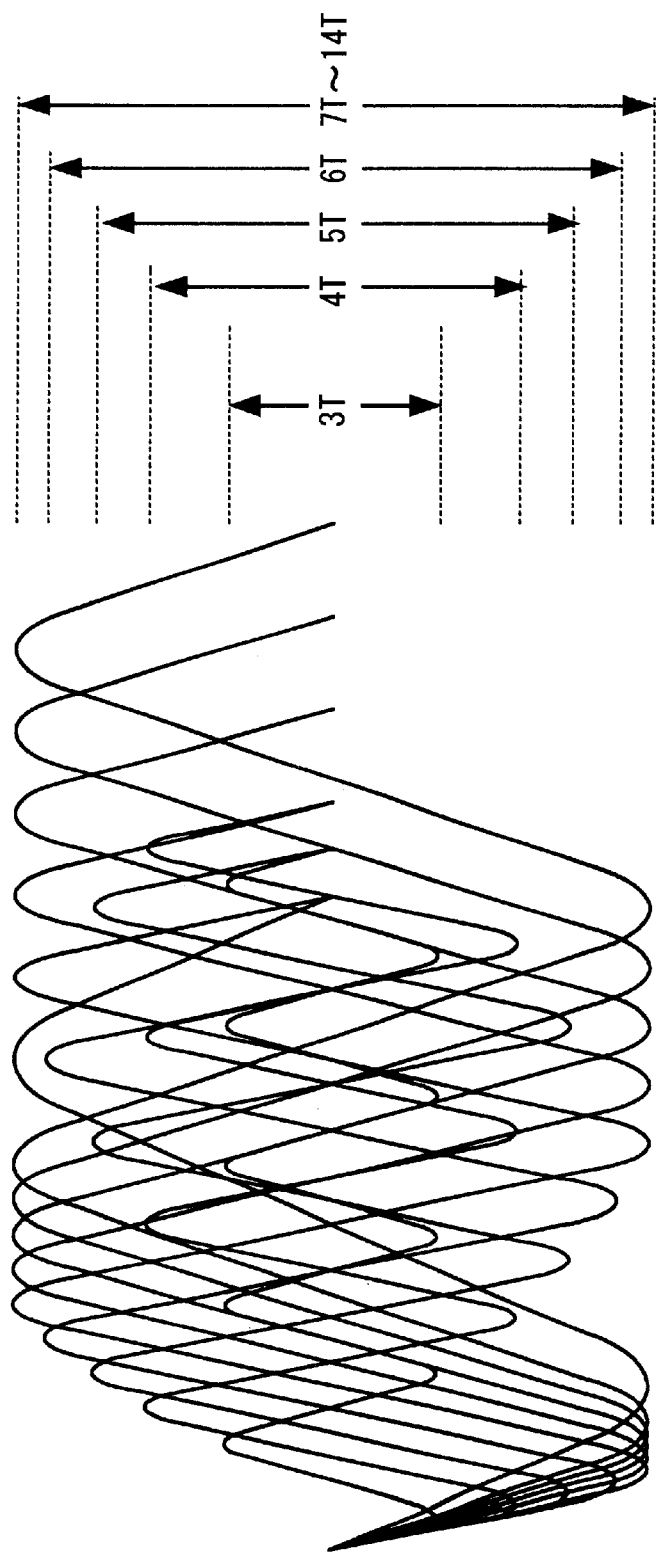
FIG. 5 is a diagram illustrating the judgement of the effective spot diameters according to an eye pattern.

Specifically, when the eye patterns are drawn by overlapping the RF signals by reading the pits having ten types of lengths 3T to 11T and 14T as shown in FIG. 5, the RF signals of the pits having lengths 3T to 6T increase their amplitudes sequentially. When the pit length becomes 7T, the amplitude of its RF signal becomes saturated, and the RF signals of the pits having lengths 7T to 14T have a fixed amplitude.

Accordingly, the pit length, namely 7T, that the amplitude of the eye pattern becomes saturated is judged as an effective spot diameter.
(Second method)

DVD-R on which a given pit-land pattern is previously recorded or DVD-ROM on which a given pit-land pattern is previously stored is read at a given area to judge an effective spot diameter.

The give pit-land pattern is, for example, a pattern which includes pits or lands having a different length sequentially.

The modulation degree, namely the amplitude, of the RF signal obtained by reading the pit-land pattern becomes saturated and constant when the amplitude reaches a length of the pit or a length of the land corresponding to the spot diameter.

Accordingly, the second method judges an effective spot diameter according to a pit length or a land length on the boundary where the RF signal has a constant amplitude when the aforesaid given pit-land pattern is read.

Figure 6:
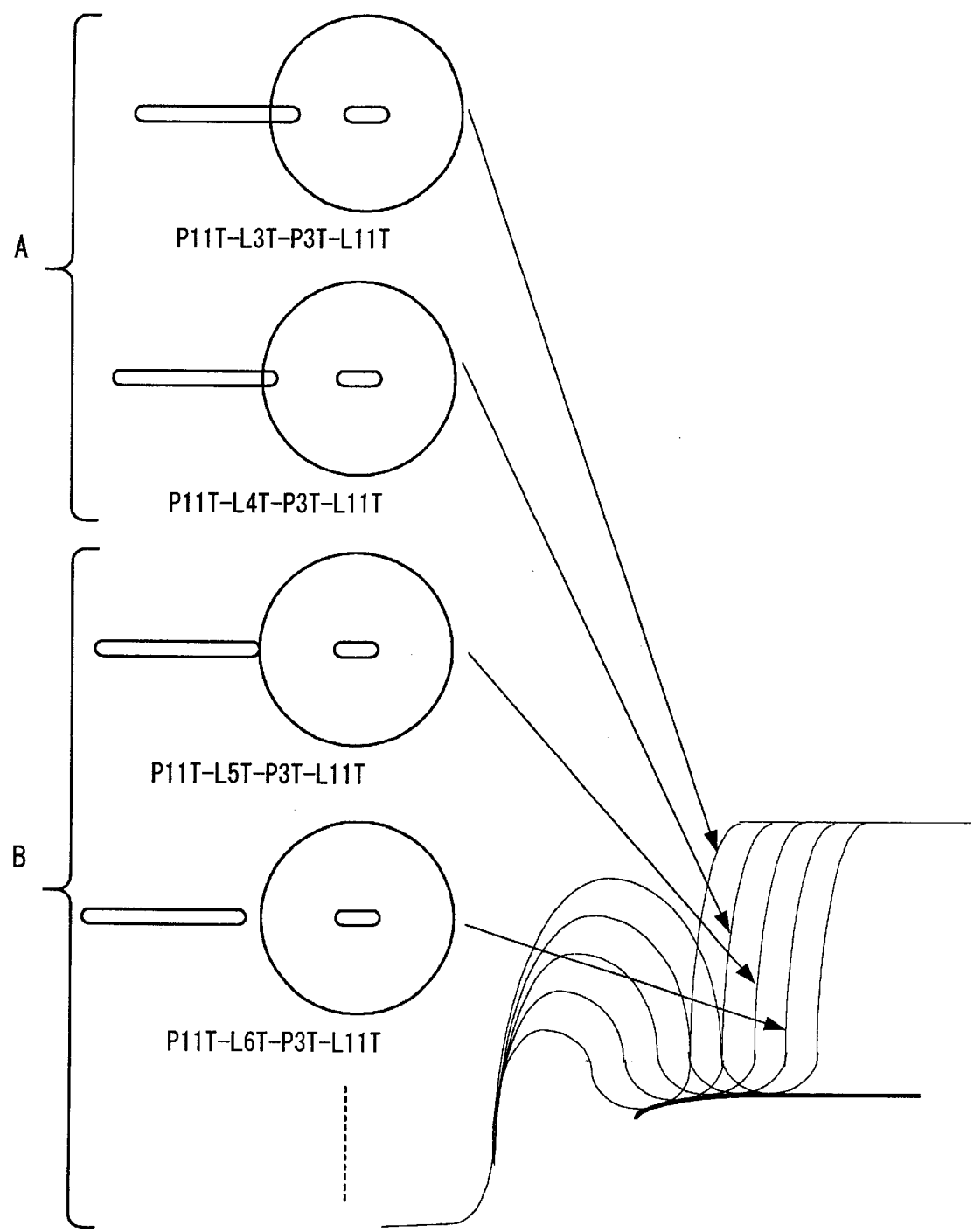
FIG. 6 is a diagram illustrating an example of the judgement of the effective spot diameters according to a pit-land pattern.

FIG. 6 shows an example of judgement of an effective spot diameter by using the aforesaid given pit-land pattern.

In FIG. 6, there is used a pit-land pattern indicated by a general formula P11T-LXT-P3T-L11T as the pit-land pattern.

In the formula, P11T indicates a pit having length 11T, LXT indicates a land having variable length X which increases sequentially from 3T, P3T indicates a pit having length 3T, and L11T indicates a land having length 11T.

And, when the RF signal obtained by reading the pit P3T having length 3T in this pit-land pattern is examined, it is assumed that the amplitude (bottom value) of the RF signal is variable when value X is 3 to 4 (range A) as shown in FIG. 6, but when the value X becomes 5, the bottom value of the RF signal becomes saturated, and the bottom value of the RF signal becomes constant in the following range B.

In such a case, the effective spot diameter is judged to be $$5T+3T+5T=13T.$$

A pit-land pattern indicated by general formula L11T-PXT-L3T-P11T can be used instead of the pit-land pattern indicated by the aforesaid general formula P11T-LXT-P3T-L11T to determine an effective spot diameter in the same way from the RF signal obtained when the land L3T having length 3T is read. In such a case, because the top value is variable, the effective spot diameter can be judged from value X as the top value becomes saturated and constant.

Figure 7:
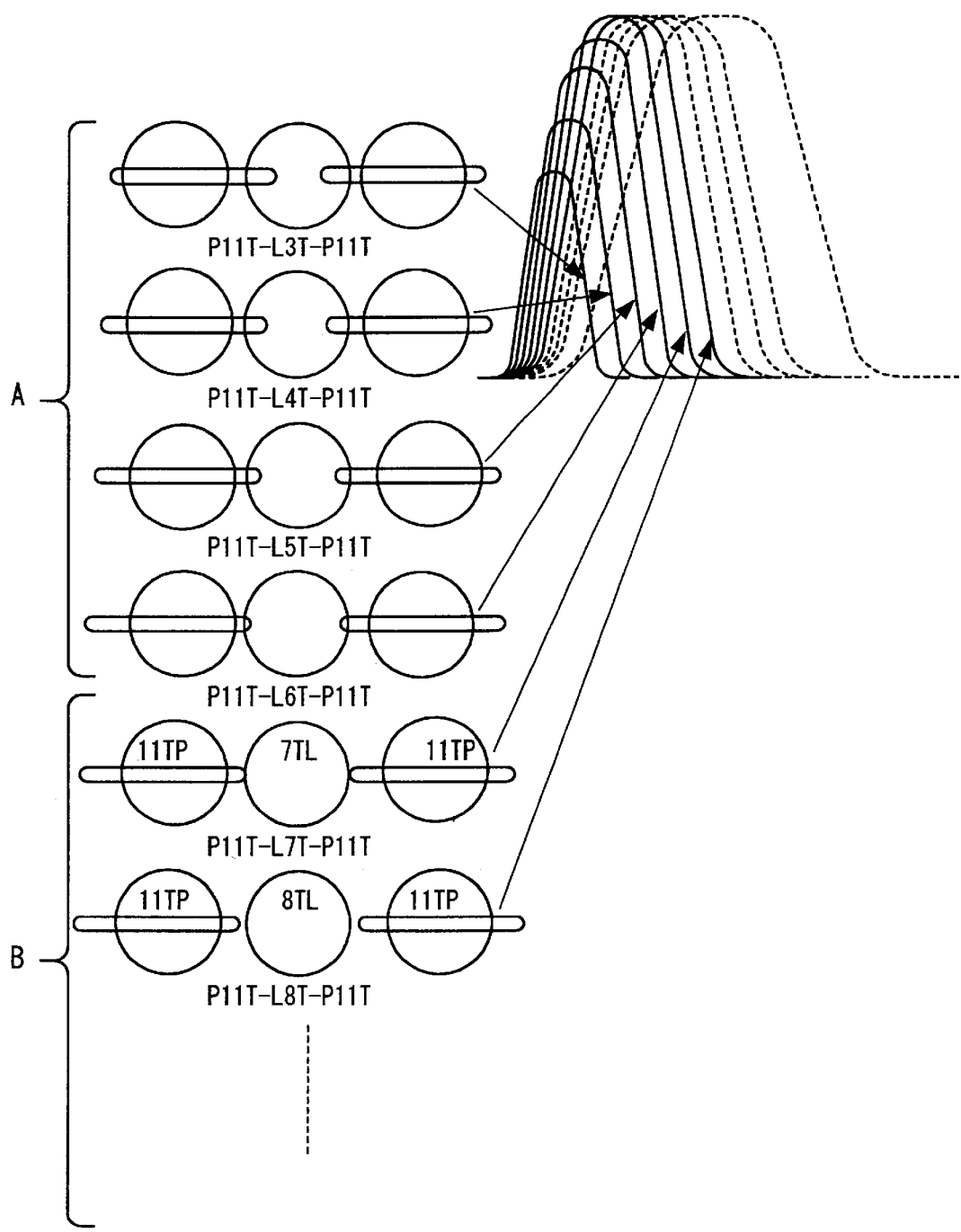
FIG. 7 is a diagram illustrating another example of the judgement of the effective spot diameters according to a pit-land pattern.

FIG. 7 shows another example of judgement of the effective spot diameter by using the aforesaid predetermined pit-land pattern.

In FIG. 7, a pit-land pattern indicated by general formula P11T-LXT-P11T is used as the aforesaid pit-land pattern.

Here, P11T means a pit having length 11T, LXT means a land having variable length X which sequentially increases from 3T, and P11T means a pit having length 11T.

In this pit-land pattern, when the pits P11T having length 11T at either end of the land having variable length X is read, the RF signal has the bottom value. Therefore, the RF signal having the top value corresponding to the land having variable length X is obtained.

And, as shown in FIG. 7, when the value X is in a range of 2 to 6 (range A), the top value of the RF signal is variable, but when X is 7, the top value of the RF signal becomes saturated. And, when the top value of the RF signal becomes constant in the following range B, the effective spot diameter can be judged 7T.

The length of the pits formed at either end of the land having the variable length X may not be 11T as far as it is longer than the diameter of the assumed effected spot.

Instead of the pit-land pattern indicated by the aforesaid general formula P11T-LXT-P11T, a pit-land pattern indicated by a general formula L11T-PXT-L11T can be used to judge the effective spot diameter in the same way. In such a case, when the lands L11T having length 11T formed at either end of the pit having variable length X is read, the RF signal has the top value. Therefore, the effective spot diameter is judged from the value X as the bottom value becomes constant.

Thus, the effective spot diameter of the optical information recording/reproducing device can be judged accurately. Then, a minimum correction of the light pulse and a correction of the reproducing RF signal can be effected according to the judged effective spot diameter.

In other words, when the effective spot diameter of the optical information recording/reproducing device can be found accurately, the heat interference can be presumed accurately according to the recording pattern, and the light pulse can be corrected optimally.

When the effective spot diameter of the optical information recording/reproducing device can be determined accurately, a pit-to-pit interference of the reproducing RF signal can be presumed, and the reproducing RF signal can be corrected optimally.

Figure 8:
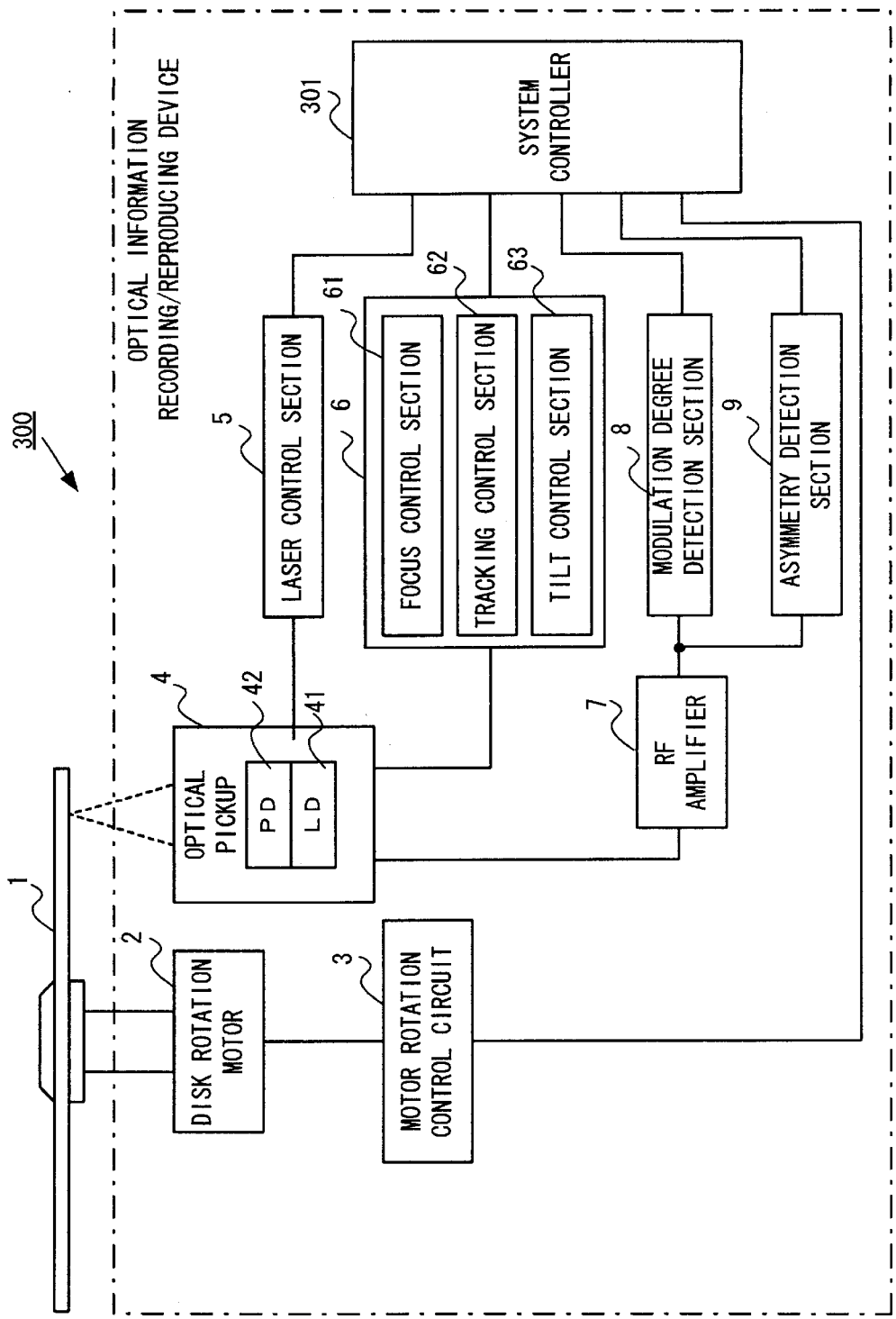
FIG. 8 is a block diagram showing a specific example of an optical information recording/reproducing device which is configured by applying the optical information recording/reproducing method and device of the present invention.

FIG. 8 is a block diagram showing an embodiment of the optical information recording/reproducing device which is configured by applying the optical information recording/reproducing method and device according to the present invention.

In FIG. 8, optical information recording/reproducing device 300 records and reproduces information on and from optical disc 1.

The optical information recording/reproducing device 300 comprises disc rotation motor 2, motor drive control circuit 3, optical pickup 4, laser control section 5, servo control section 6, RF amplifier 7, modulation degree detection section 8, asymmetry detection section 9, and system controller 301.

The disc rotation motor 2 drives to rotate optical disc 1 at a given rotation speed according to a drive signal supplied from the motor drive control circuit 3.

The motor drive control circuit 3 supplies the drive signal to the disc rotation motor 2 according to an instruction signal input from system controller 301.

The optical pickup 4 has laser diode (LD) 41, known four-part split photodetector (PD) 42, an unshown objective lens actuator and the like.

The optical pickup 4 is movable in a radial direction of the optical disc 1 by a pickup-advance mechanism by, for example, a known linear motor system.

The laser control section 5 enters a digital signal corresponding to information to be recorded and generates a light pulse from the digital signal according to strategy setting information designated by the system controller 301. Besides, a drive current corresponding to the intensity of laser light designated by the system controller 301 is supplied to the laser diode 41 of the optical pickup 4 in synchronization with the light pulse.

Thus, the laser diode 41 of the optical pickup 4 emits the laser light having intensity designated by the system controller 301.

The servo control section 6 has focus control section 61, tracking control section 62 and tilt control section 63 and controls the operation of the pickup advance mechanism and the objective lens actuator of the optical pickup 4 according to the instruction from the system controller 301.

The RF amplifier 7 amplifies the RF signal output from the optical pickup 4 to output to the modulation degree detection section 8 and the asymmetry detection section 9.

The asymmetry detection section 9 is known mounted on an ordinary optical information recording/reproducing device and detects known asymmetry from the RF signal to output the detected result to the system controller 301.

The system controller 301 comprises CPU (central processing unit) and outputs a control instruction to the laser control section 5 and the servo control section 6 according to the output signals from the modulation degree detection section 8 and the asymmetry detection section 9 to record information. At this time, a computation to be described afterward is made, and information is recorded while correcting the emission timing and pulse width of the laser light for recording in real time.

Figure 9:
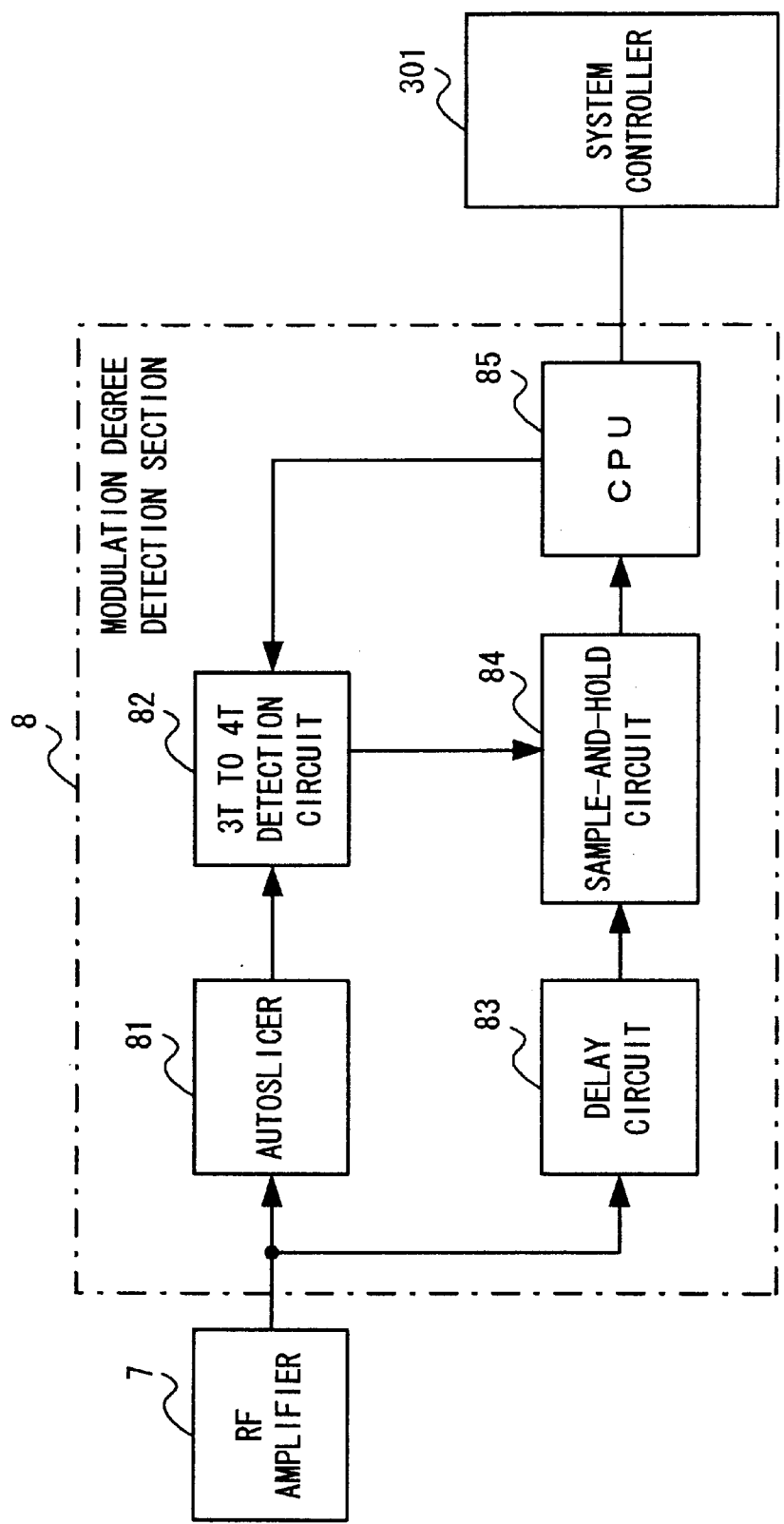
FIG. 9 is a block diagram showing a structural example of the modulation degree detection section shown in FIG. 8.

The modulation degree detection section 8 configures a judging section (effective spot diameter judging means) for the effective spot diameter according to the present invention and comprises autoslicer 81, 3T–14T detection circuit 82, delay circuit 83, sample-and-hold circuit 84 and CPU 85 as shown in FIG. 9.

The autoslicer 81 binarizes the RF signal to output with a voltage having an average value (middle value) of the top and bottom levels of 3T pulse of the RF single determined as a threshold value.

Figure 10:
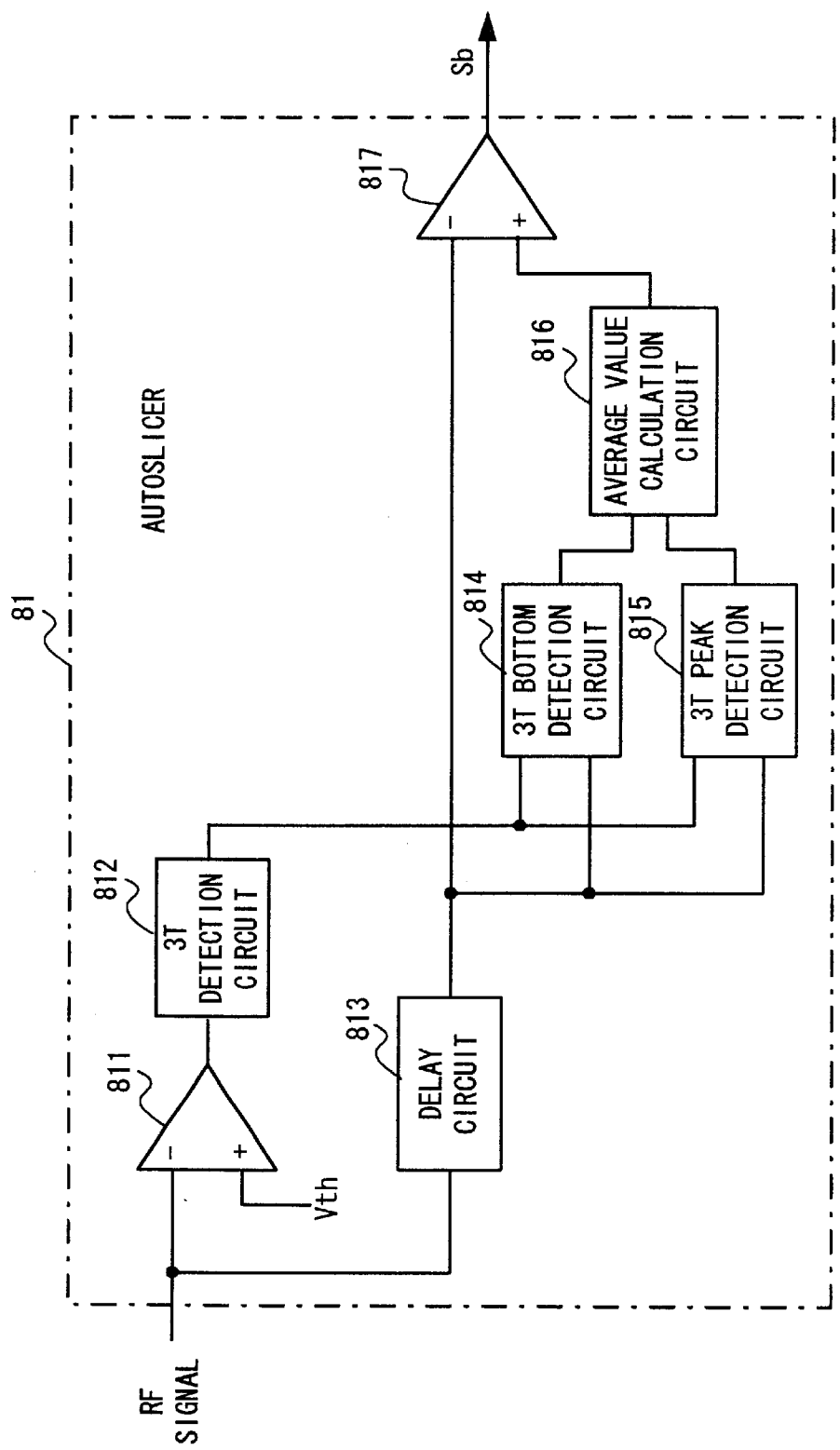
FIG. 10 is a block diagram showing a structural example of the autoslicer shown in FIG. 9.

For example, the autoslicer 81 comprises comparator 811, 3T detection circuit 812, delay circuit 813, 3T bottom detection circuit 814, 3T peak detection circuit 815, average value calculation circuit 816 and comparator 817 as shown in FIG. 10.

Figure 11:
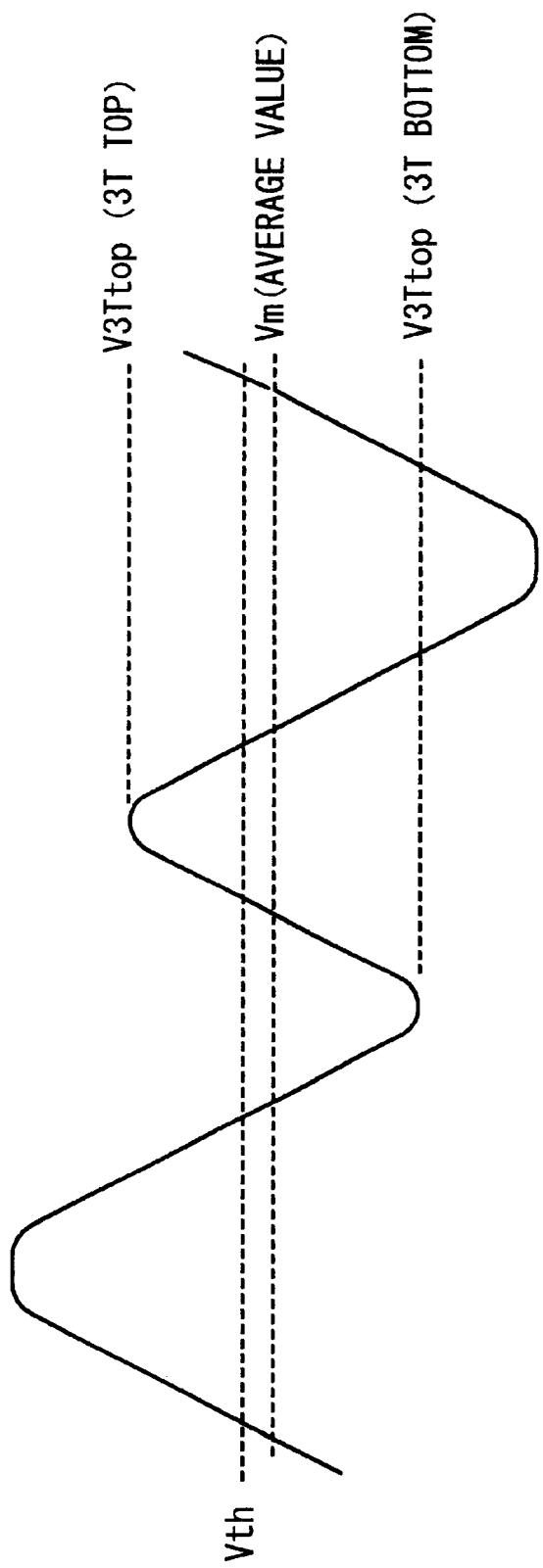
FIG. 11 is a waveform chart illustrating operation of the autoslicer shown in FIG. 10.

The RF signal is entered the reversing input terminal of the comparator 811, and threshold voltage Vth is entered a non-reversing input terminal. The threshold voltage Vth is a previously determined voltage which is substantially the average value of the top level (V3Ttop) and bottom level (V3Tbtm) of the 3T pulse as shown in FIG. 11. Thus, the comparator 811 binarizes the RF signal by the threshold voltage Vth to output to the 3T detection circuit 812.

The 3T detection circuit 812 detects the 3T pulse from the entered binarizing signal and outputs the detected signal to the 3T bottom detection circuit 814 and the 3T peak detection circuit 315.

The delay circuit 813 enters the RF signal and delays it for a predetermined duration to output. The 3T bottom detection circuit 814 detects the bottom level of the 3T pulse of the RF signal entered from the delay circuit 813 when the detected signal is entered from the 3T detection circuit 812 and outputs the voltage.

The 3T peak detection circuit 815 detects the top level of the 3T pulse of the RF signal entered from the delay circuit 813 when the detected signal is entered from the 3T detection circuit 812 and outputs the voltage.

The average value calculation circuit 816 calculates to output average (middle value) voltage Vm of the two voltages entered from the 3T bottom detection circuit 814 and the 3T peak detection circuit 815.

The comparator 817 enters the RF signal output from the delay circuit 813 into the reversing input terminal and the average voltage Vm into the non-reversing input terminal, and outputs signal Sb obtained by binarizing the RF signal by the average voltage Vm.

The autoslicer 81 configured as described above outputs as the binarized signal Sb the RF signal with the average voltage Vm of the top level and the bottom level of the 3T pulse. Thus, the 3T pulse sensitive to jitter can be detected accurately.

The 3T–14T detection circuit 82 enters the binarized signal Sb output from the autoslicer 81 and outputs the detected signal to the sample-and-hold circuit 84 when a land or a pit having a pulse width designated by the CPU 85 is detected.

The delay circuit 83 enters the RF signal and delays it for a predetermined duration to output. The sample-and-hold circuit 84 enters the RF signal from the delay circuit 83, sample-holds the voltage level of the RF signal when the detected signal is entered from the 3T–14T detection circuit 82, and outputs this value to the CPU 85.

When the CPU 85 receives a modulation degree detection request from the system controller 301, detection of the pits and lands having lengths 3T to 14T is instructed to the 3T–14T detection circuit 82, and obtains the voltage levels of the pits and the lands having lengths 3T to 14T from the sample-and-hold circuit 84 to judge an effective spot diameter. The effective spot diameter judging method by the CPU 85 is as described above. The effective spot diameter judged by the CPU 85 is notified to the system controller 301.

According to the effective spot diameter and the pit-land pattern recorded at the front and rear of the pit or land to be recorded, the system controller 301 presumes a level of heat interference at the time of recording the pit or land to be recorded and corrects a storage pulse corresponding to the pit or land to be recorded according to the presumed level of the heat interference.

Specifically, the system controller 301 selects a combination in which residual heat energy remained in the optical disc 1 on which the pits are formed is considered having a large influence on the next pit forming and assigns priorities to correct the light pulse so to ease more effectively an influence of the residual heat energy and the heat energy applied into the laser light spot diameter.

In other words, the influence of the residual heat energy by the heat energy within the spot diameter cannot be disregarded as a length of the land between the pits becomes shorter, and a shorter pit is influenced easily by the heat energy.

Therefore, the correction of the light pulse performed according to the length of the land immediately in front of the pit to be formed is assigned a first priority, and when the pit to be formed has length 3T, the correction of the light pulse to be performed according to the length of the land immediately behind the pit having the length 3T is assigned a second priority.

When the pit to be formed is a pit having the length 3T, the correction of the light pulse to be performed according to a length of the land immediately in front of the pit having the length 3T and a length of the pit before that and the correction of the light pulse to be performed according to a length of the land immediately behind the pit having the length 3T and a length of the pit behind that are assigned a third priority.

Thus, priorities are assigned in order of from larger to smaller influences of the heat interference, and when the correction is to be performed in practice, it is performed in order of decreasing precedence so that a jitter value and DEV become minimum.

A condition for detecting the correction range is determined when the optical information recording/reproducing deviceis produced or determined by measuring a modulation degree when a user of the device reproduces DVD-ROM.

In such a case, it is necessary to determined a linear speed of the optical information recording/reproducing device. Generally, the linear speed can be determined previously because the optical information recording/reproducing device for DVD-R is provided with a linear speed detection means. For example, when DVD-ROM is reproduced, the linear speed is described as a data bit length or stored in a memory circuit of the recording/reproducing device.

And, even if the linear speed could not be detected, it can be mechanically detected with ease. Because a radius of a recording/reproducing position on the disc can be determined by time, the number of rotations can be determined accurately by means for measuring time required for one rotation when the laser light is spotted to a given radius position. When an FG-provided spindle is used, the number of rotations can be detected readily.

Distinction of 3.8 m/s or 3.49 m/s can be made readily from DVD.

Moreover, reasons to use DVD-ROM are as follows.

The causes of the deterioration of the jitter include reproduction interference by the laser light spot at reproducing, heat interference between pits at recording and heat interference due to a spot diameter. And, when ROM is used, heat interference which basically generates at recording is nil, and spot interference only can be seen purely.

The spot interference is similar to the reproduction interference but different according to whether it acts at recording or reproducing. Therefore, by using DVD-ROM, the correction range for suppressing the occurrence of heat interference at recording information on DVD-R can be determined in a state not affected by the heat interference caused at recording the information.

For example, the above correction range is detected by the following procedure.

First, DVD-ROM is reproduced to determine a linear speed.

Then, top and bottom levels of the RF signal are measured in order of 3T to 14T in a reproducing state. At this time, the device configured as described above performs the following (a) to (f) in this order.

(a) It is judged in real time that the signal being reproduced at the time is which of signals having lengths 3T to 14T.

(b) An instruction for detecting the top level of the 3T signal is output from CPU 85 to the 3T–14T detection circuit 82.

(c) The 3T–14T detection circuit 82 outputs a detection signal for detecting the top level of the 3T signal.

(d) The delayed RF signal is sampled and held.

(e) The sampled and held voltage value is taken in by CPU 85 and stored in the memory.

(f) The above steps (a) to (e) are performed on the tops and bottoms (pits and lands) of all Ts such as 3T bottom, 4T top, 4T bottom, . . . 14T bottom.

Then, CPU 85 determines whether the modulation degree becomes maximum (constant) from which T signal according to the respective top and bottom levels.

According to the obtained result and the linear speed, the system controller 301 determines a range of correction needed for elimination of the heat interference.

As a specific method for correction of the light pulse, the following (1) to (3) can be used for example.

(1) Correction of the pit to be formed

Duty is uniformly changed. For example, the duty is uniformly decreased only by 1T.

The front end is further moved forward for a shorter pit. This is because a temperature increase at the front end of the pit takes time to form the pit and a shorter pit has a lower peak temperature.

A shorter pit has the rear end further displaced backward. This is because the shorter pit has a lower peak temperature and less heat energy is given to the rear end.

(2) Correction considering the length of lands at the front and rear of the pit to be formed The front end of the pit to be formed is moved backward more as the land just in front of the pit to be formed is shorter.

The rear end of the pit to be formed is moved forward more as the land immediately behind the pit to be formed is shorter.

(3) Correction considering the length of pits at the front and rear of the pit to be formed The front end of the pit to be formed is moved backward more as the pit present at the front of the land which is immediately in front of the pit to be formed is longer.

The rear end of the pit to be formed is moved forward more as the pit present behind the land which is immediately behind the pit to be formed is longer.

Specifically, because the correction range has been specified, a range that the heat interference does not generate can also be specified. For example, when the effective spot diameter is 7T, heat interference is nil at a distance of 8T or more, so that the top level of nT land (n is any of 3 to 14) after 8T is used as reference, and a correction amount is always determined to be equal to the reference.

In such a case, a trial writing disc is separately necessary, and when the optical information recording/reproducing device is produced or the device user desires to use a new media, test recording can be made to deal with.

For example, when a correction amount of the light pulse for forming the 3T pit is determined, the device configured as described above performs the following treatments (a) to (d).

(a) The top level of the 3T land immediately behind the pit having length 8T or more is stored as reference.

(b) Then, the top level of the 3T land immediately behind the 3T pit is detected.

When the detected top level is higher than the reference, the correction amount is decreased, and when it is lower, the correction amount is increased. Thus, the operations are repeated, and the correction amount to match the reference with the level is determined as the best correction amount.

(c) The top level of the 3T land immediately behind the 3T pit following the 3T land is detected, and the correction amount is determined to match the reference with the level.

(d) The top level of the 3T land immediately behind the 3T pit following the 4T land is detected, and the correction amount is determined to match the reference with the level.

When the effective spot diameter is 7T, the 5T land has a total distance of 8T or more (the effective spot diameter or more), so that the aforesaid (a) to (d) may be performed.

And, all correction amounts can be decided by performing the above treatments (a) to (d) for all combinations requiring correction.

Therefore, the pit having optimum length and form can be formed by emitting the laser light pulse by the corrected light pulse.

Normally, the heat interference can be mostly eased by performing the correction of the pit to be formed of (1) above.

When the optical pickup of the information recording device is inclined with respect to the optical disc, the spot becomes large due to an influence of coma. In such a case, the combined correction range may be changed according to the effective spot diameter.

As described above, because the light pulse is corrected in consideration of the heat energy applied into the laser light spot diameter according to this embodiment, a pit having an optimum shape can be always formed even if the pit shape is made very small with respect to the laser light spot diameter which becomes considerable in high density recording.

Besides, priorities are assigned by selecting a case most susceptible to an influence of the energy interference so to correct the light pulse, so that an influence of the residual energy to the pit to be formed by the residual energy at forming the pit in front of the pit to be formed and an influence of the residual energy to the following pit when the pit to be formed is formed can be eased, and the pit having optimum length and shape can always be formed.

FIG. 12 is a diagram showing an example of correcting the light pulse.

FIG. 12 shows a case that the effective spot diameter is 7T, and an influence is exerted upon the pit to be recorded is in a range from the pit to be recorded to the effective spot diameter or 7T. Therefore, FIG. 12 shows an example of correction corresponding to the pattern in the range of the pit to be recorded.

For example, when the pit to be recorded is 3T and there are pit P3 of 3T and land L3 of 3T in front of the pit to be recorded, rising of the light pulse corresponding to the pit to be recorded is corrected by +5 ns.

When the pit to be recorded is 3t and there are pit P* having any length of 4T or more and land L3 of 3T in front of the pit to be-recorded, rising of the light pulse corresponding to the pit to be recorded is corrected by +3 ns.

And, when the pit to be recorded is 3T and there are land L3 of 3T and pit P3 of 3T behind the pit to be recorded, rising of the light pulse corresponding to the pit to be recorded is corrected by +3 ns.

When the pit to be recorded is 3T and there are land L3 of 3T and pit P* having any length of 4T or more behind the pit to be recorded, falling of the light pulse corresponding to the pit to be recorded iscorrected by +2 ns.

Similarly, when the pit to be recorded is 3T and there is land L4 of 4T in front of the pit to be recorded, rising of the light pulse corresponding to the pit to be recorded is corrected by +2 ns.

And, when the pit to be recorded is 3T and there is land L4 of 4T behind the pit to be recorded, falling of the light pulse corresponding to the pit to be recorded is corrected by +1 ns.

As described above, the correction of the light pulse according to the spot diameter judged from the optical information recording/reproducing device was described. Then, optimum correction of the reproducing signal according to the effective spot diameter will be described.

Figure 13A:
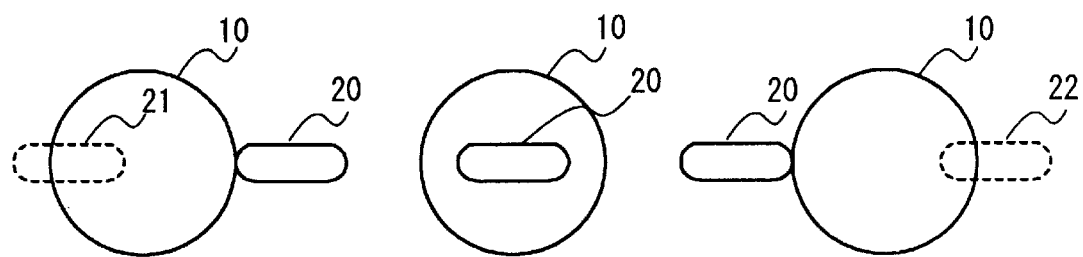
FIGS. 13(a) and 13(b) are diagrams illustrating an influence upon a reproduction signal of an effective spot diameter.
Figure 13B:
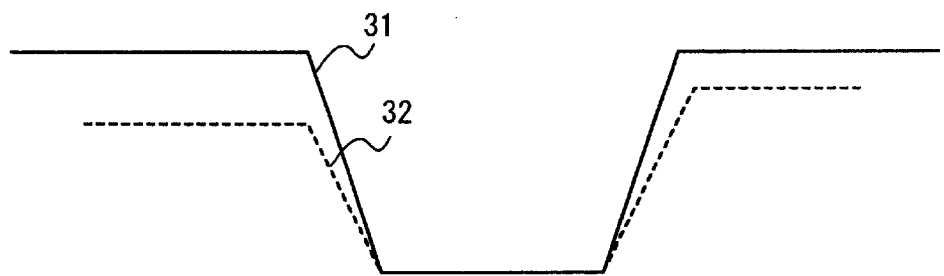

Specifically, even when the same pit is read, its reproducing signal is variable as described below depending on the spot 10 of the laser light, the pit 20 and the presence or not of another pit related to the pit 20 as shown in FIGS. 13(a) and 13(b).

When the pit indicated by the dotted line is not present in FIG. 13(a), the reproducing signal of the pit 20 is indicated by solid line 31 of FIG. 13(b).

But, when there are pits 21, 22 indicated by the dotted line in relation to the pit 20, and if the pits 21, 22 enter the effective spot range of the spot 10 of the laser light when the pit 20 is read, the reproducing signal is changed as indicated by dotted line 32 of FIG. 13(b).

In other words, a modulation degree of the pit 20 decreases owing to the presence of the pit 21 in front of the pit 20 is read, and the top level, namely amplitude, lowers. Such a lowering amount is variable depending on the effective pit diameter of the spot 10 of the laser light and a distance between the pit 20 and the pit 21.

And, the inclination of the reproducing signal, namely a frequency component, is also variable according to the effective pit diameter of the spot 10 of the laser light and a distance between the pit 20 and the pit 21.

Similarly, after the pit 20 is read, a modulation degree of the pit 20 decreases owing to the presence of the pit 22, and the top level, namely amplitude, lowers. Such a lowering amount is variable depending on the effective pit diameter of the spot 10 of the laser light and a distance between the pit 20 and the pit 22.

And, the inclination of the reproducing signal, namely the frequency component, is also variable according to the effective pit diameter of the spot 10 of the laser light and a distance between the pit 20 and the pit 22.

Therefore, in order to obtain an accurate reproducing signal, it is necessary to correct the level of the reproducing signal and the frequency component.

But, when the accurate effective spot diameter of the optical information recording/reproducing device can be found, the reproducing signal can be corrected optimally according to the effective spot diameter.

In this embodiment, when the pit or land to be reproduced is reproduced according to the effective spot diameter and the pit-land pattern to be recorded at the front or rear of the pit or land to be reproduced, a level of the change in the amplitude and a level of the change in the frequency component of the reproducing signal are presumed, and the reproducing signal corresponding to the pit or land to be reproduced is corrected according to the presumed levels of the changes in amplitude and frequency component.

Here, the amplitude change of the reproducing signal can be corrected by adjusting a gain of the reproducing signal, and the frequency component change can be corrected by adjusting the delay amount of the reproducing signal.

Therefore, when the accurate effective spot diameter of the optical information recording/reproducing device can be found, the change in the amplitude of the reproducing signal can be corrected by adjusting a gain depending on the effective spot diameter, and the change in the frequency component can be corrected by adjusting the delay amount depending on the effective spot diameter.

The adjustment of the gain of the reproducing signal and the adjustment of the delay amount can be made by a known technology combining an equalizer and a low pass filter.

Figure 14:
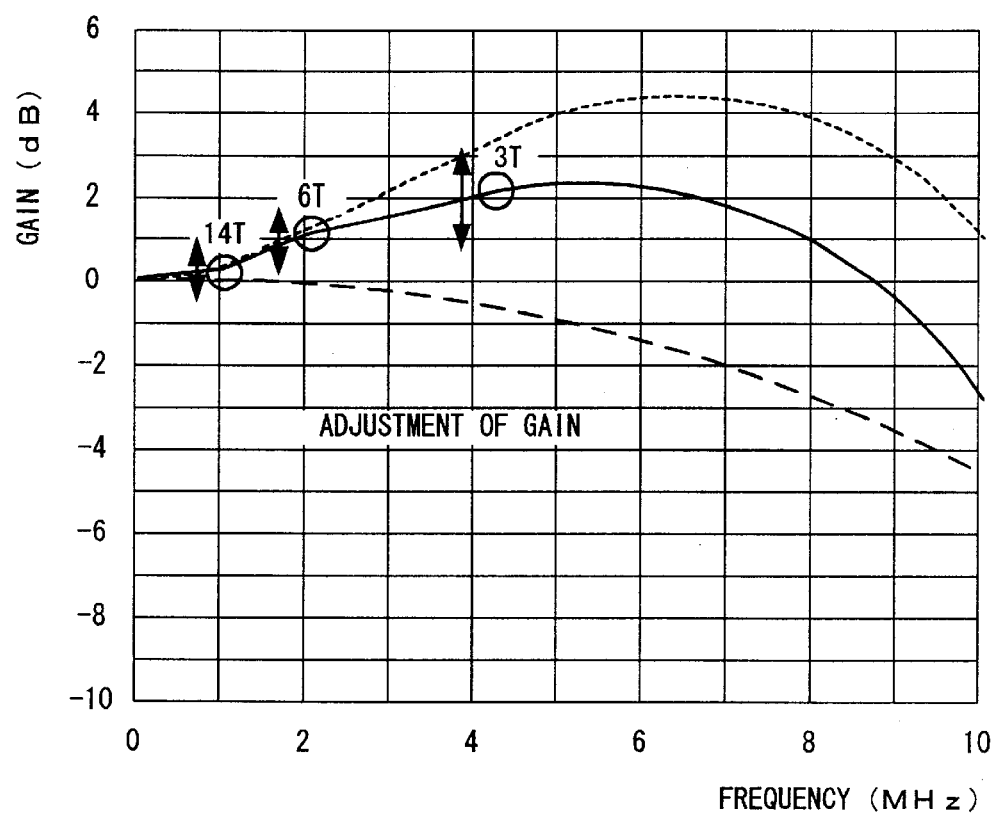
FIG. 14 is a graph illustrating an adjustment of a gain of a reproduction signal.

FIG. 14 is a graph illustrating the adjustment of a gain of the reproducing signal. In FIG. 14, the dotted line indicates the gain adjustment by the equalizer only, the broken line indicates the gain adjustment by the low pass filter only, and the solid line indicates the gain adjustment by a combination of the equalizer and the low pass filter.

Here, because the effective spot diameter of the optical information recording/reproducing device is known, when this effective spot diameter is assumed to be 7T, the gain adjustment with the equalizer and the low pass filter combined may be performed for the 3T to 6T portions only.

Specifically, the amplitude change is small in the pit and land area larger than the effective spot diameter, so that it can be determined as an equalization characteristic that the gain value becomes constant.

Figure 15:
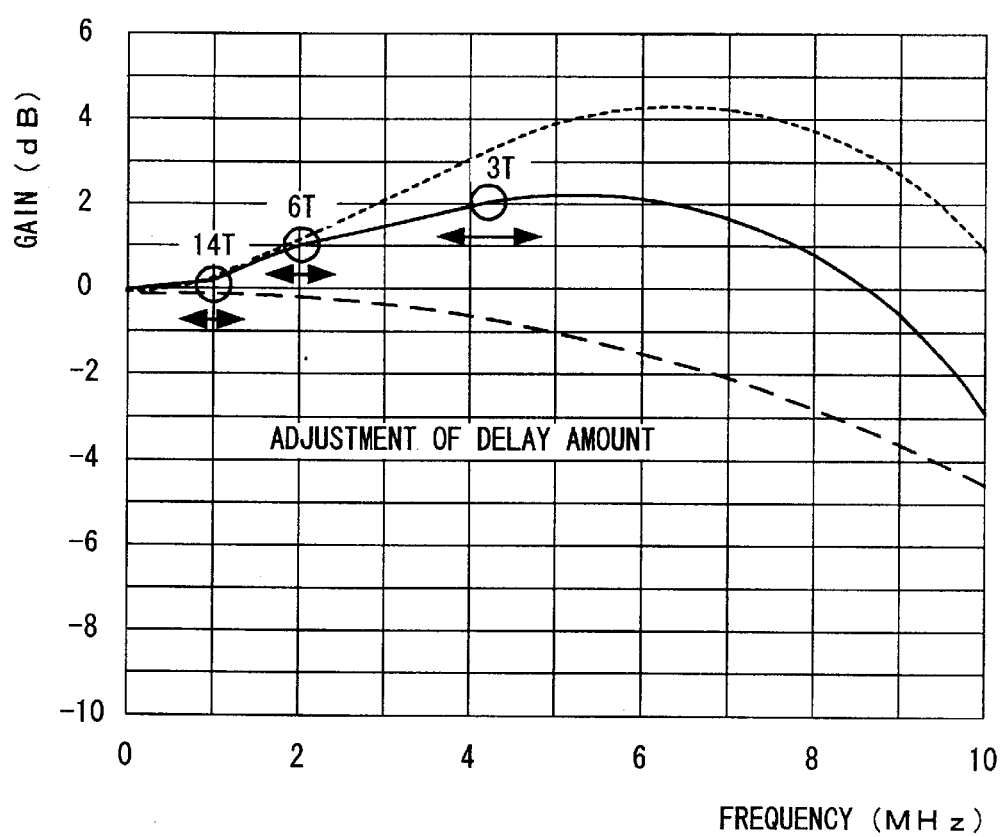
FIG. 15 is a graph illustrating an adjustment of a delay amount of a reproduction signal.

FIG. 15 is a graph illustrating the adjustment of a delay amount of the reproducing signal.

In FIG. 15, the dotted line indicates the adjustment of a delay amount by the equalizer only, the broken line indicates the adjustment of a delay amount by the low pass filter only, and the solid line indicates the adjustment of a delay amount by a combination of the equalizer and the low pass filter.

Here, because the effective spot diameter of the optical information recording/reproducing device is known, when the effective spot diameter is assumed to be 7T, the gain adjustment may be made by a combination of the equalizer and the low pass filter for only the pit-land pattern which enters the effective spot diameter at the front and rear of the 3T to 6T portions. The correction of the delay amount by the equalizer is also necessary because the frequency band depends on a relation between the effective spot diameter and the pit.

INDUSTRIAL APPLICABILITY

The present invention provides an optical information recording/reproducing method and a device which can optimally record information on an optical information recording medium for high-density and high-speed recording and can reproduce the information optimally.

According to the present invention, the laser light is irradiated to the optical information recording medium to obtain a reproducing signal corresponding to the pit-land pattern recorded on the optical information recording medium, and a relative effective spot diameter of the laser light corresponding to the standard length T is judged according to the reproducing signal. And, it is configured that according to the judged effective spot diameter, a correction range at recording of the information is specified, and the recording pulse is corrected according to the specified correction range. Therefore, the information can be formed by the pits and lands having the optimum length and shape not influenced by the heat interference between the laser light spots.

It is also configured that when reproducing information, the correction range of the reproducing signal is specified according to the judged effective spot diameter, and the reproducing signal is corrected according to the specified correction range. Therefore, the information can be reproduced optimally from the optical information recording medium such as CD-R or DVD-R for high-density recording.

What is claimed is:

1. An optical information recording/reproducing method which irradiates laser light corresponding to a recording pulse to an optical information recording medium to form a pit-land pattern consisting of pits and lands having a plurality of lengths in integral multiple nT (n is an integer) of a predetermined standard length T so to record information, the method comprising:
    a first step of irradiating the laser light to the optical information recording medium to obtain a reproducing signal corresponding to the pit-land pattern recorded on the optical information recording medium and judging a relative effective spot diameter of the laser light corresponding to the standard length T according to the reproducing signal, and
    a second step of specifying a correction range at recording the information according to the effective spot diameter judged in the first step and correcting the recording pulse according to the specified correction range.

2. The optical information recording/reproducing method according to claim 1, wherein the recording pulse is an EFM signal subjected to EFM modulation.

3. The optical information recording/reproducing method according to claim 1, wherein the first step separately reads the plurality of pits or lands having the different lengths previously recorded on the optical information recording medium to obtain a plurality of reproducing signals corresponding to the pits or lands having the different lengths, and judges the effective spot diameter according to the length of the pit or land with which amplitudes of the reproducing signals become saturated and constant.

4. The optical information recording/reproducing method according to claim 1, wherein the first step obtains an eye pattern of the reproducing signal by reading the plurality of pits or lands having the different lengths previously recorded on the optical information recording medium and determines the effective spot diameter according to the length of the pit or land with which an amplitude of the eye pattern becomes saturated and constant.

5. The optical information recording/reproducing method according to claim 1, wherein the first step reads the predetermined pit-land pattern in which the length of the pit or land previously recorded on the optical information recording medium changes sequentially and judges the effective spot diameter according to the length of the pit or land with which an amplitude of the reproducing signal obtained by the above reading becomes saturated and constant.

6. The optical information recording/reproducing method according to claim 1, wherein the second step presumes a level of heat interference at recording of the pit or land to be recorded according to the pit-land pattern to be recorded at the front and rear of the pit or land to be recorded and the effective spot diameter judged in the first step, and corrects the recording pulse corresponding to the pit or land to be recorded according to the presumed level of the heat interference.

7. The optical information recording/reproducing method according to claim 6, wherein the second step corrects a rising timing or a falling timing of the recording pulse corresponding to the pit to be recorded according to a length of a reference land immediately in front of or behind the pit to be recorded.

8. The optical information recording/reproducing method according to claim 6, wherein the second step corrects a rising timing or a falling timing of the recording pulse corresponding to the pit to be recorded according to a length of a reference land immediately in front of the pit to be recorded and a length of a reference pit immediately in front of or behind the reference land.

9. The optical information recording/reproducing method according to claim 6, wherein the second step corrects a rising timing or a falling timing of the recording pulse corresponding to the pit to be recorded according to the length of the pit to be recorded.

10. The optical information recording/reproducing method according to claim 6, wherein the second step corrects a rising timing or a falling timing of the recording pulse corresponding to the pit to be recorded according to a recording speed.

11. An optical information recording/reproducing method which irradiates laser light corresponding to a recording pulse to an optical information recording medium to form a pit-land pattern consisting of pits and lands having a plurality of lengths in integral multiple nT (n is an integer) of a predetermined standard length T so to record information, the method comprising:
    a first step of irradiating the laser light to the optical information recording medium to obtain a reproducing signal corresponding to the pit-land pattern recorded on the optical information recording medium and judging a relative effective spot diameter of the laser light corresponding to the standard length T according to the reproducing signal, and
    a second step of specifying a correction range at reproduction of the information according to the effective spot diameter judged in the first step and correcting the reproducing signal according to the specified correction range.

12. The optical information recording/reproducing method according to claim 11, wherein the recording pulse is an EFM signal subjected to EFM modulation.

13. The optical information recording/reproducing method according to claim 11, wherein the first step separately reads the plurality of pits or lands having the different lengths previously recorded on the optical information recording medium to obtain a plurality of reproducing signals corresponding to the pits or lands having the different lengths, and judges an effective spot diameter according to the length of the pit or land with which amplitudes of the reproducing signals become saturated and constant.

14. The optical information recording/reproducing method according to claim 11, wherein the first step obtains an eye pattern of the reproducing signal by reading the plurality of pits or lands having the different lengths previously recorded on the optical information recording medium and judges the effective spot diameter according to the length of the pit or land with which an amplitude of the eye pattern becomes saturated and constant.

15. The optical information recording/reproducing method according to claim 11, wherein the first step reads the predetermined pit-land pattern in which the length of the pit or land previously recorded on the optical information recording medium changes sequentially and judges the effective spot diameter according to the length of the pit or land with which an amplitude of the reproducing signal obtained by the above reading becomes saturated and constant.

16. The optical information recording/reproducing method according to claim 11, wherein the second step presumes a level of changes in amplitude and frequency component of the reproducing signal at reproduction of the pit or land to be reproduced according to an effective spot diameter judged in the first step and the pit-land pattern recorded at the front and rear of the pit or land to be reproduced and corrects the reproducing signal corresponding to the pit or land to be reproduced according to a presumed level of the changes in the amplitude and frequency component.

17. The optical information recording/reproducing method according to claim 16, wherein the second step corrects the changes in the amplitude and frequency component of the reproducing signal by adjusting a gain of the reproducing signal and a delay amount.

18. The optical information recording/reproducing method according to claim 17, wherein the second step adjusts the gain of the reproducing signal and the delay amount by a combination of an equalizer and a low pass filter.

19. An optical information recording/reproducing device which irradiates laser light corresponding to a recording pulse to an optical information recording medium to form a pit-land pattern consisting of pits and lands having a plurality of lengths in integral multiple nT (n is an integer) of a predetermined standard length T so to record information, the device comprising:
    effective spot diameter judging means which irradiates the laser light to the optical information recording medium to obtain a reproducing signal corresponding to the pit-land pattern recorded on the optical information recording medium and judges a relative effective spot diameter of the laser light corresponding to the standard length T according to the reproducing signal, and
    recording pulse correcting means which specifies a correction range at recording of the information according to the effective spot diameter judged by the effective spot diameter judging means and corrects the recording pulse according to the specified correction range.

20. The optical information recording/reproducing device according to claim 19, wherein the effective spot diameter judging means separately reads the plurality of pits or lands having the different lengths previously recorded on the optical information recording medium and judges the effective spot diameter according to the length of the pit or land with which amplitudes of a plurality of reproducing signals corresponding to the pits or lands having the different lengths obtained by reading become saturated and constant.

21. The optical information recording/reproducing device according to claim 19, wherein the effective spot diameter judging means reads the predetermined pit-land pattern in which the lengths of the pits or lands previously recorded on the optical information recording medium change sequentially and judges the effective spot diameter according to the length of the bit or land with which an amplitude of the reproducing signal obtained by the above reading becomes saturated and constant.

22. The optical information recording/reproducing device according to claim 19, wherein the recording pulse correcting means presumes a level of heat interference at recording of the pit or land to be recorded according to the effective spot diameter judged by the effective spot diameter judging means and the pit-land pattern to be recorded at the front and rear of the pit or land to be recorded and corrects a storage pulse corresponding to the pit or land to be recorded according to the presumed level of heat interference.

23. An optical information recording/reproducing device which irradiates laser light corresponding to a recording pulse to an optical information recording medium to form a pit-land pattern consisting of pits and lands having a plurality of lengths in integral multiple nT (n is an integer) of a predetermined standard length T so to record information, the device comprising:
    effective spot diameter judging means which irradiates the laser light to the optical information recording medium to obtain a reproducing signal corresponding to the pit-land pattern recorded on the optical information recording medium and judges a relative effective spot diameter of the laser light corresponding to the standard length T according to the reproducing signal, and
    reproducing signal correcting means which specifies a correction range at reproduction of the information according to the effective spot diameter judged by the effective spot diameter judging means and corrects the reproducing signal according to the specified correction range.

24. The optical information recording/reproducing device according to claim 23, wherein the effective spot diameter judging means separately reads the plurality of pits or lands having the different lengths previously recorded on the optical information recording medium and judges the effective spot diameter according to the length of the pit or land with which amplitudes of the plurality of reproducing signals corresponding to the pits or lands having the different lengths obtained by the above reading becomes saturated and constant.

25. The optical information recording/reproducing device according to claim 19, wherein the effective spot diameter judging means reads the predetermined pit-land pattern in which the lengths of the pits or lands previously recorded on the optical information recording medium change sequentially and judges the effective spot diameter according to the length of the bit or land with which an amplitude of the reproducing signal obtained by the above reading becomes saturated and constant.

26. The optical information recording/reproducing device according to claim 19, wherein the reproducing signal correcting means presumes a level of changes in amplitude and frequency component of the reproduction signal at reproduction of the pit or land to be reproduced according to the effective spot diameter judged by the effective spot diameter judging means and the pit-land pattern to be recorded at the front and rear of the pit or land to be reproduced, and corrects the reproducing signal corresponding to the pit or land to be reproduced according to a presumed level of the changes in the amplitude and frequency component.

27. The optical information recording/reproducing device according to claim 26, wherein the reproducing signal correcting means adjusts a gain of the reproducing signal and a delay mount to correct the changes in the amplitude and the frequency component of the reproducing signal.

28. The optical information recording/reproducing device according to claim 27, wherein the reproducing signal correcting means adjusts the gain and the delay amount of the reproducing signal by a combination of an equalizer and a low pass filter.

* * * * *